APPARATUS FOR MAGNETIC RECORDING OF SOUND ON RECORD CARDS

Filed Dec. 31, 1952 2 Sheets-Sheet 1

INVENTOR.
Chester M. MacChesney
BY
Smith, Olsen & Baird
Attys.

Aug. 26, 1958 C. M. MacCHESNEY 2,849,542

APPARATUS FOR MAGNETIC RECORDING OF SOUND ON RECORD CARDS

Filed Dec. 31, 1952 2 Sheets-Sheet 2

INVENTOR.
Chester M. MacChesney
BY
Smith, Olsen + Baird
Attys.

United States Patent Office 2,849,542

Patented Aug. 26, 1958

2,849,542

APPARATUS FOR MAGNETIC RECORDING OF SOUND ON RECORD CARDS

Chester M. MacChesney, Chicago, Ill., assignor to Ellamac Incorporated, Chicago, Ill., a corporation of Illinois Application December 31, 1952, Serial No. 328,955

3 Claims. (Cl. 179—100.2)

The present invention relates to apparatus for recording sound on magnetic media carried by record cards, and more particularly to the manufacture of record cards adapted for use in pronouncing dictionary apparatus of the character disclosed in the copending application of Chester M. MacChesney, Serial No. 322,983, filed November 28, 1952, now Patent No. 2,677,200, granted May 4, 1954.

This pronouncing dictionary apparatus employs a substantially rectangular record card bearing an elongated array of symbols indicative of the spelling of a given word and carrying an elongated magnetic medium having magnetically recorded thereon phonetic characters indicative of the pronunciation of the given word, and comprises a sound reproduction unit that is arranged to support the record card and to move or feed it across a cooperating magnetic pickup head; whereby the array of symbols mentioned borne by the record card may be viewed by an observer at the same time that the sound reproduction unit pronounces the given word. Also the record card usually carries an appropriate printing giving the accepted definition or meaning of the given word.

It is the general object of the present invention to provide an improved apparatus for magnetically recording sound on a record card of the character noted, that involves moving the magnetic recording head longitudinally relative to the record card supported in a stationary position so as positively to insure a substantially straight-line magnetic recording on the elongated magnetic medium carried by the record card and to obtain a high degree of parallelism between the magnetic recording thus produced and a reference edge of the record card.

Another object of the invention is to provide an improved apparatus for producing such magnetic recordings, that is exceedingly simple and particularly well adapted to the mass production of the record cards.

A further object of the invention is to provide an improved apparatus for magnetically recording sound on a record card of the character noted, that involves a magnetic recording head including a pair of adjacent longitudinally spaced-apart pole pieces and a coupled field winding, as well as an elongated magnetic medium carried by the record card, the pole pieces being moved in respective leading and trailing relation with respect to each other and traveling at a substantially uniform recording speed longitudinally along and in firm engagement with the elongated magnetic medium while the field winding is energized with electric signal current corresponding to the sound that is to be recorded.

A further object of the invention is to provide magnetic recording apparatus of the character described, that includes a platen and an improved arrangement for removably supporting and for selectively clamping in place a record card with respect to the platen, as well as an improved arrangement for guiding and moving the magnetic recording head in clamped relation with respect to the supported record card.

Further features of the invention pertain to the particular arrangement of the elements of the apparatus, whereby the above-outlined and additional operating features thereof are attained.

The invention, both as to its organization and principle of operation, together with further objects and advantages thereof, will best be understood by reference to the following specification taken in connection with the accompanying drawings, in which.

Figure 1:
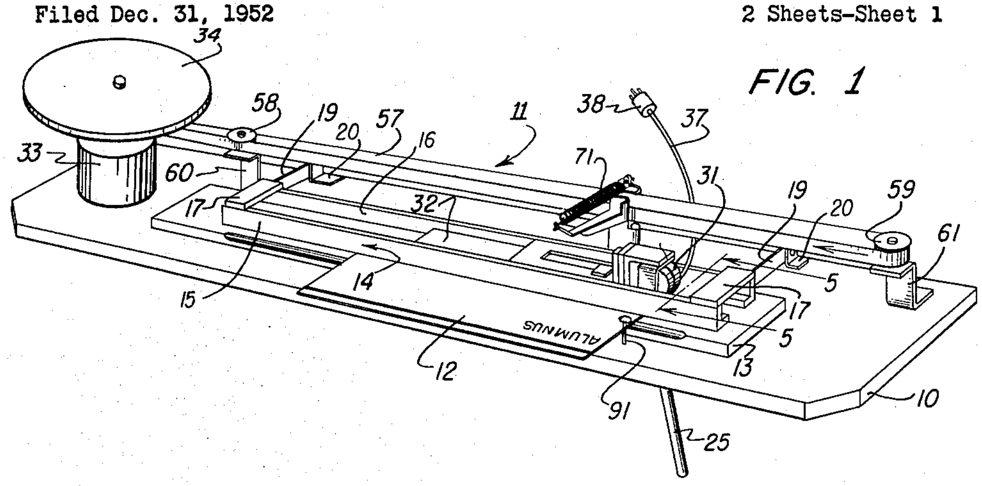
Figure 1 is a fragmentary perspective view of a table supporting magnetic sound recording apparatus embodying the present invention.
Figures 3, 4, 5, 6, 7:
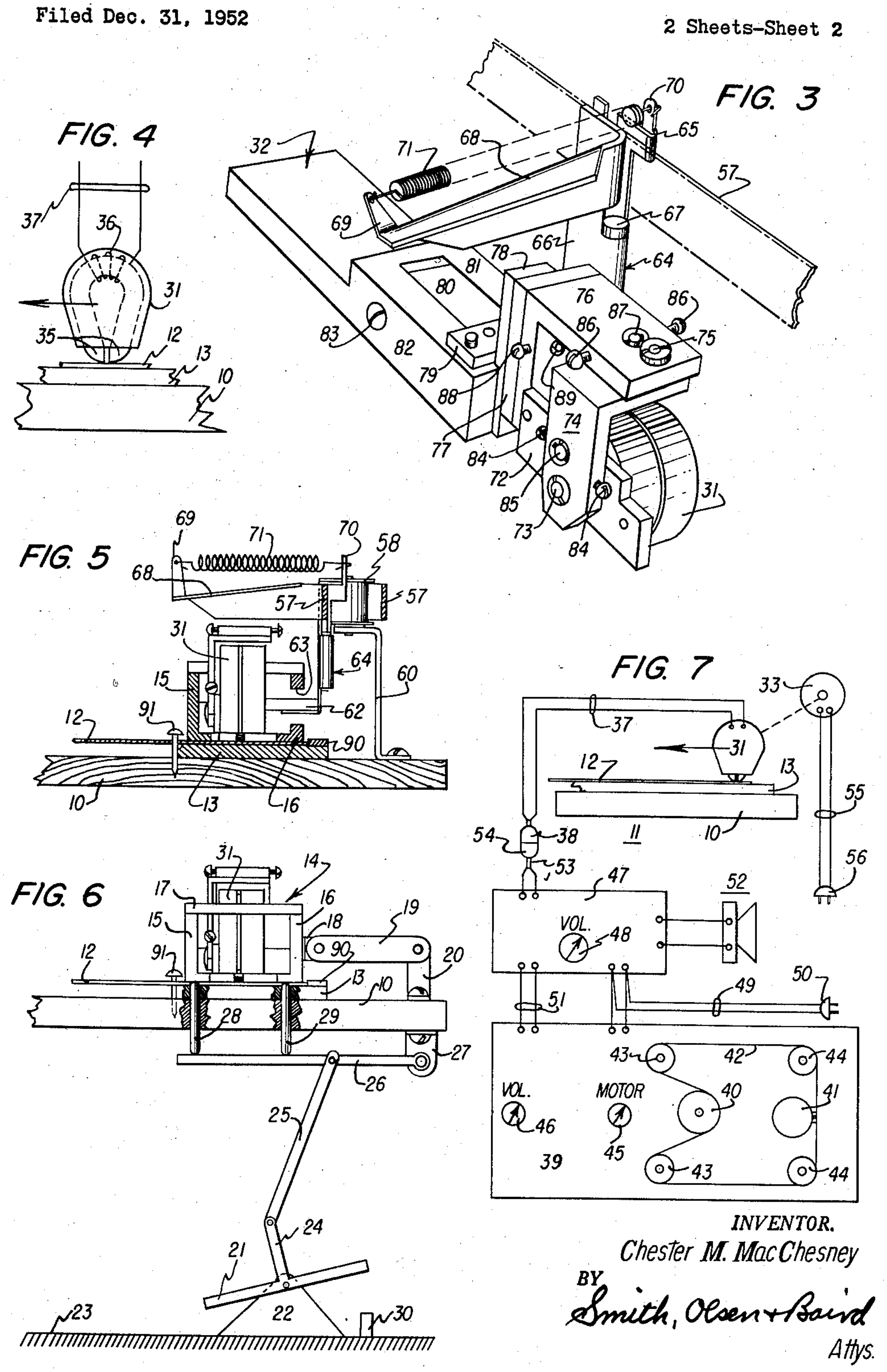
Fig. 3 is a greatly enlarged fragmentary perspective view of the magnetic recording head and its supporting slide and a portion of the associated drive mechanism therefor.
Fig. 4 is an enlarged fragmentary front view of the magnetic recording head and the record card supported by the associated platen.
Fig. 5 is a lateral sectional view of the guide mounting the slide carrying the magnetic recording head for longitudinal movement with respect to the associated record card supported by the associated platen, this figure being taken in the direction of the arrows along the line 5—5 in Fig. 1.

Fig. 6 is an enlarged end view, partly broken away, of the apparatus shown in Fig. 1, illustrating the parts shown in Fig. 5, together with the associated mechanism for moving the guide toward and away from the platen into respective clamping and release positions with respect to the record card supported by the platen; and Fig. 7 is an electrical diagram of the circuit elements incorporated in the recording apparatus shown in Fig. 1.

Referring now to Figs. 1 and 6 of the drawings, there is illustrated an elongated table or platform 10 that is mounted in a substantially horizontal position and that supports apparatus 11 for magnetically recording sound on an elongated record card 12 and embodying the features of the present invention. More particularly, the recording apparatus 11 comprises an elongated platen 13 secured to the front upper surface of the platform 10 and formed of metal and having a flat smooth polished top surface arranged directly to receive and to support the record card 12. Also the recording apparatus 11 comprises an elongated guide 14 that is mounted for movement toward and away from the platen 13 for the purpose of selectively clamping the removable record card 12 in place. The guide 14 includes elongated front and rear elements 15 and 16, that are substantially L-shaped in cross-section and secured together by longitudinally spaced-apart straps 17. Two longitudinally spaced-apart ears 18 are secured to the rear element 16 and pivotally connected to two corresponding longitudinally spaced-apart links 19, that are, in turn, pivotally connected to two corresponding longitudinally spaced-apart brackets 20 secured to the rear upper surface of the platform 10.

The guide 14 is selectively moved toward and away from the platen 13 upon the mounting arrangement, including the links 19, by an arrangement including a foot treadle 21 supported by a pedestal 22 carried by the floor 23. The foot treadle 21 is provided with an upwardly directed arm 24, that is pivotally connected to a link 25, that, in turn, is pivotally connected to a plate 26 arranged below the platform 10 and pivotally connected at the rear edge thereof upon a pair of longitudinally spaced-apart depending ears 27 secured to the rear lower surface of the platform 10. The front of the plate 26 cooperates with two pairs of longitudinally spaced-apart pins, each pair of pins including a front pin 28 and a rear pin 29 slidably mounted in aligned openings formed in the opposite ends of the platform 10 and in the opposite ends of the platen 13. As illustrated in Fig. 6, the pins 28 and 29 that are slidably mounted in the aligned openings provided in the right-hand end of the platform 10 and in the right-hand end of the platen 13 cooperate between the plate 26 and the elements 15 and 16, the lower ends of the pins 28 and 29 respectively engaging the lower surfaces of the elements 15 and 16. In the arrangement, when the foot treadle 21 is rocked forwardly about the pedestal 22, in the counterclockwise direction as viewed in Fig. 6, the links 24 and 25 are disaligned permitting the plate 26 to be lowered away from the platform 10, so that the weight of the guide 14 moves the pins 28 and 29 downwardly, the guide 14 pivoting in the counterclockwise direction about the links 19 in order that the record card 12 is securely clamped between the platen 13 and the guide 14. On the other hand, when the foot treadle 21 is rocked rearwardly about the pedestal 22, in the clockwise direction as viewed in Fig. 6, the links 24 and 25 are aligned so that the plate 26 is raised toward the platform 10 sliding the pins 28 and 29 upwardly in order to move the guide 14 away from the platen 13 about the mounting, including the links 19, so as to release the record card 12. The foot treadle 21 cooperates with a stop 30 disposed adjacent to the rear of the pedestal 22 and carried by the floor 23, so that the foot treadle 21 has a stable position in its rearwardly rocked position in order that the guide 14 may be retained in its upward position away from the platen 13. As previously noted, when the foot treadle 21 is rocked forwardly, as viewed in Fig. 6, the weight of the guide 14 is sufficient to bias it downwardly toward the platen 13, after the links 24 and 25 are disaligned, so that the record card 12 is securely clamped in place between the lower surfaces of the elements 15 and 16 and the upper surface of the platen 13.

Further, the recording apparatus 11 comprises a magnetic recording head 31 that is carried by a slide 32, that, in turn, is mounted for longitudinal sliding movement in the guide 14 between the elements 15 and 16, as well as an arrangement for moving the slide 32 in the guide 14, that includes an electric drive motor 33 provided with a flywheel 34. As indicated in Fig. 4, the recording head 31 is provided with a pair of pole pieces 35 arranged in longitudinally spaced-apart relation and having a coupled field winding 36, the terminals of which are connected by a cable 37 to a circuit connector 38.

As best shown in Fig. 7, the recording apparatus 11 further comprises a signal production unit 39 including a drive motor, not shown, operatively connected to a drive pulley 40 and a magnetic pickup head 41, as well as an endless belt 42 carrying a master magnetic medium having magnetically recorded thereon a given word. The endless belt 42 is arranged in driven relation with the pulley 40 and traverses the pole pieces of the magnetic pickup head 41 by virtue of a guide arrangement including two cooperating idler pulleys 43 disposed adjacent to the drive pulley 40 and two cooperating idler pulleys 44 disposed adjacent to the magnetic pickup head 41. Further, the speed of the drive motor, not shown, of the unit 39 may be appropriately set by an arrangement including an adjustable control knob 45; and the signal output of the magnetic pickup head 41 may be appropriately set by an arrangement including an adjustable volume control knob 46. Also the apparatus 11 comprises an amplifier 47, the volume of which may be appropriately set by an associated adjustable control knob 48. Power is supplied to the unit 39 and to the amplifier 47 in parallel circuit relation by a cable 49 that terminates in a plug 50 that is adapted to be inserted into an associated receptacle provided with a source of power supply of 115-volts, single phase, A. C. The output circuit of the unit 39 is connected directly to the input circuit of the amplifier 47 via an associated cable 51; and the output circuit of the amplifier 47 is connected in parallel both to a loudspeaker 52 and to a cable 53 terminating in a circuit connector 54, that, in turn, receives the circuit connector 38 terminating the cable 37 extending to the magnetic recording head 31. Finally, the drive motor 33 for the magnetic pickup head 31 is connected by a cable 55 to a plug 56 that is adapted to be received by a receptacle provided with a source of power supply of 115-volts, single phase, A. C.

In view of the foregoing, it will be understood that when the electrical parts of the recording apparatus 11, illustrated in Fig. 7, are in their operating condition, the drive motor, not shown, of the unit 39 causes the endless belt 42 repeatedly to traverse the pole pieces of the magnetic pickup head 41; whereby an electric signal current is produced repeatedly, and corresponding to the given word magnetically recorded on the endless belt 42, and supplied to the amplifier 47. The amplifier 47 amplifies the signal current mentioned, supplying it repeatedly both to the loudspeaker 52 and to the magnetic recording head 31. Of course, the loudspeaker 52 reproduces audibly the given word at the same time that the corresponding electric signal current is supplied to the magnetic recording head 31. Also at this time, the magnetic recording head 31 may be operatively connected to the drive motor 33, in order to cause the drive motor 33 to move the magnetic recording head 31 at a proper recording speed and in recording relation with respect to an elongated magnetic medium provided upon the record card 12; whereby the word mentioned recorded upon the endless tape 42 is, in turn, recorded upon the magnetic medium mentioned carried by the record card 12; the operation of the recording apparatus 11 to bring about the recording of the given word, as noted above, is described in detail hereinafter.

Figure 2B:
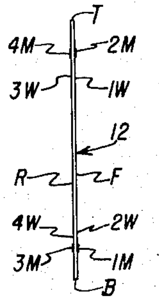
Fig. 2B is an enlarged end view of the adjacent left-hand end of the record card in relation to its position shown in Fig. 2A.
Figure 2A:
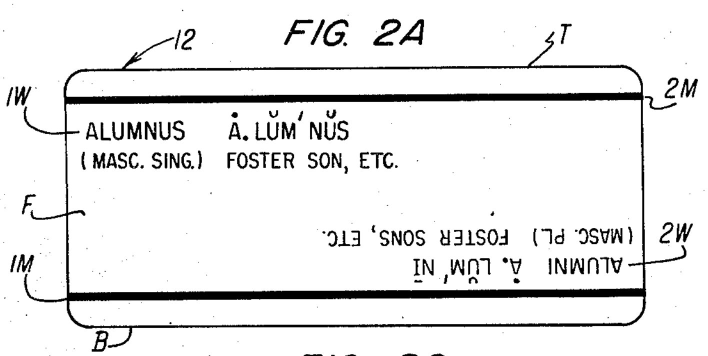
Fig. 2A is an enlarged face view of the front side of the record card shown in Fig. 1.
Figure 2D:
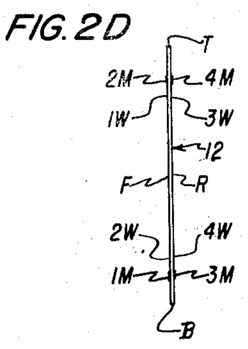
Fig. 2D is an enlarged end view of the adjacent left-hand end of the record card in relation to its position shown in Fig. 2C.
Figure 2C:
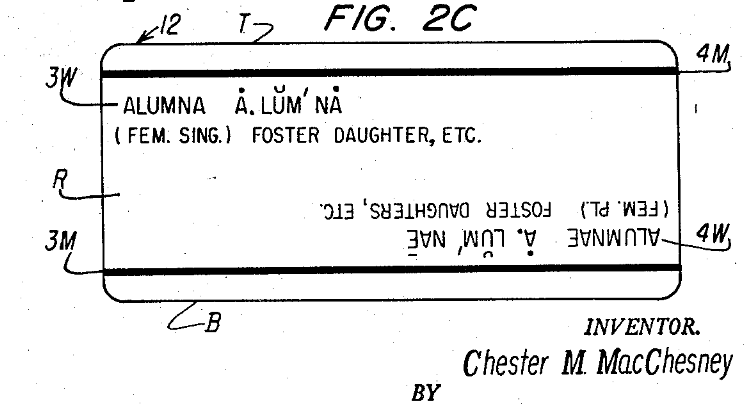
Fig. 2C is an enlarged face view of the rear side of the record card shown in Fig. 2A.

Referring now to Figs. 2A, 2B, 2C and 2D, it is noted that the record card 12 is preferably of the construction and arrangement of that disclosed in the previously-mentioned copending application of Chester M. MacChesney and essentially comprises a flat sheet formed of paper stock, or the like, and having a substantially rectangular configuration; whereby the record card 12 includes a front surface or face F, a rear surface or face R, two substantially parallel side edges and two substantially parallel end edges, the two side edges being hereinafter termed, for reference purposes, the top edge T and the bottom edge B, respectively. As illustrated, the record card 12 bears four arrays of symbols respectively indicated at 1W, 2W, 3W and 4W, and respectively corresponding to the words: "alumnus," "alumni," "alumna" and "alumnae," employed only for the purpose of description. Each array of symbols 1W, etc., indicates the spelling and preferred pronunciation of the corresponding word, as well as a definition thereof. In the arrangement, the words 1W, etc., may be printed on the record card 12; the word 1W begins adjacent to the upper left-hand front face of the card 12 and the printing is disposed upright from left to right, as shown in Fig. 2A; the word 2W begins adjacent to the lower right-hand front face of the card 12 and the printing is disposed inverted from right to left, as shown in Fig. 2A; the word 3W begins adjacent to the upper left-hand rear face of the card 12 and the printing is disposed upright from left to right, as shown in Fig. 2C; and the word 4W begins adjacent to the lower right-hand rear face of the card 12 and the printing is disposed inverted from right to left, as shown in Fig. 2C. Thus it will be understood that an observer may read directly the word 1W when the card occupies its position of Fig. 2A; while the card 12 must be rotated 180° from its position of Fig. 2A so that the observer may read the word 2W. Similarly the card 12 is reversed 180° so that the word 3W is in normal position to the observer, as illustrated in Fig. 2C; while the card 12 must be further rotated 180° so that the word 4W is in normal position to the observer, as illustrated in Fig. 2C.

Further, the card 12 comprises four magnetic media 1M, 2M, 3M, 4M respectively correspoding to the words 1W, 2W, 3W and 4W; the magnetic medium 1M being carried on the lower front of the card 12 in a position substantially parallel to the bottom edge B; the magnetic medium 2M being carried on the upper front of the card 12 in a position substantially parallel to the top edge T; the magnetic medium 3M being carried on the lower rear of the card 12 in a position substantially parallel to the bottom edge B; and the magnetic medium 4M being carried on the upper rear of the card 12 in a position substantially parallel to the top edge T. In the arrangement, magnetic recordings in the form of phonetic characters indicative of the pronunciation of the corresponding words 1W, etc., are recorded upon the respective magnetic medium 1M, etc. Also in the arrangement, the words 1W, etc., are disposed substantially parallel to the respective adjacent edges of the card 12 and spaced therefrom a first predetermined distance; and likewise the magnetic media 1M, etc., are disposed substantially parallel to the respective adjacent edges of the card 12 and spaced therefrom a second predetermined distance. For example, the card 12 may have a length of 9" and a width of 3½"; the center lines of the magnetic media 1M, etc., may be spaced ⅝" from the respective adjacent edges of the card 12; and each of the magnetic media 1M, etc., may have a width of about 5/16"; the card 12 having a thickness appropriate to render it reasonably stiff and yet flexible. Thus it will be appreciated that the magnetic media 1M and 3M are arranged in superimposed relation through the bottom of the card 12; and the magnetic media 2M and 4M are arranged in superimposed relation through the top of the card 12.

The record cards 12 may be formed of materials other than paper, such for example as the various plastic materials, including cellulose acetate, etc.; and the magnetic media 1M, etc., may take any conventional form. While the magnetic media 1M, etc., may consist of separate magnetic tapes secured to the surfaces of the record card 12, it is normally more convenient to print or paint them upon the surface of the record cards 12 utilizing commercially available paramagnetic printing or painting inks or other materials. For instance, the magnetic media 1M, etc., may consist of a thin layer of paramagnetic material in powdered form bonded to the surfaces of the record card 12.

Referring now to Figs. 1, 3 and 5, the recording apparatus 11 further comprises an endless drive belt 57 that is driven by a pulley, not shown, carried by the shaft of the drive motor 33 just below the flywheel 34 and that travels in guided relation upon two longitudinally spaced-apart idler pulleys 58 and 59 respectively carried by two longitudinally spaced-apart brackets 60 and 61 secured to the rear upper surface of the platform 10. In the arrangement, the front portion of the endless belt 57 disposed between the idler pulleys 58 and 59 is arranged above and rearwardly of and substantially parallel to the guide 14, and comprises a portion of the previously-mentioned arrangement for moving the slide 32 within the guide 14, the slide 32 carrying the recording head 31 on the right-hand end thereof, as previously noted. More particularly, a rearwardly directed arm 62 is carried by the rear of the slide 32 and projects through a longitudinally extending slot 63 formed in the element 16, as best shown in Fig. 5; which arm 62 carries upstanding clutch structure 64 cooperating with the front portion of the endless belt 57. Specifically, the clutch structure 64 includes an upstanding stationary clutch plate 65 arranged adjacent the rear surface of the front portion of the endless belt 57 and a movable clutch plate 66 arranged adjacent to the front surface of the front portion of the endless belt 57, the clutch plates 65 and 66 being hinged together by an upstanding pintle 67. The movable clutch plate 66 includes a forwardly projecting arm 68 carrying an upstanding tab 69 on the front end thereof that is arranged in alignment with an upstanding tab 70 carried by the stationary clutch plate 65, a coil spring 71 extending between the tabs 69 and 70 and being secured thereto at the opposite ends thereof, the coil spring 71 projecting over the upper edge of the front portion of the endless belt 57. When the clutch mechanism 64 occupies its disengaged position, the clutch plates 65 and 66 disengage the front portion of the endless belt 57 permitting free movement thereof independently of the clutch mechanism 64 and consequently of the slide 32 and the head 31 carried thereby. On the other hand, when the clutch mechanism 64 is engaged, the clutch plates 65 and 66 grip the front portion of the endless belt 57 therebetween; whereby the slide 32 and the head 31 carried thereby are moved with the endless belt 57 from the right toward the left in the guide 14. More particularly, in the arrangement, the endless belt 57 is driven at an appropriate recording speed of about 2.13 inches per second, so that the slide 32 and the recording head 31 carried thereby are moved at this recording speed in the guide 14 when the clutch 64 occupies its engaged position. The clutch 64 is of the over-center type with respect to the positions of the spring 71 and the pintle 67; whereby the clutch 64 may be readily operated between its engaged and disengaged positions by manually moving the arm 68 over center in an obvious manner.

As previously pointed out the magnetic recording head 31 is carried on the right-hand end of the slide 32; which arrangement includes a plate 72 directly secured to the head 31 and pivotally mounted by a pivot pin 73 upon one arm of a substantially L-shaped bracket 74. In turn, the other arm of the bracket 74 is pivotally mounted by a pivot pin 75 upon one arm of a substantially L-shaped bracket 76; and, in turn, the other arm of the bracket 76 is pivotally mounted upon an upstanding plate 77, that is secured to an upstanding plate 78, that, in turn, is secured to a laterally extending plate 79. Finally, the laterally extending plate 79 is secured to the right-hand end of a block 80, arranged in a slot formed in the right-hand end of the slide 32 and defining two laterally spaced-apart legs 81 and 82, the left-hand end of the block 80 being pivotally mounted upon a laterally extending pivot pin 83 extending between the legs 81 and 82. The arrangement of the pivotally mounted block 80 disposed between the legs 81 and 82 permits pivotal movement of the magnetic recording head 31 toward and away from the magnetic medium provided on the record card 12 as the slide 32 is moved longitudinally so as to insure proper contact between the pole pieces 35 of the magnetic recording head 31 with the magnetic medium mentioned during the longitudinal movement of the magnetic recording head 31.

For the purpose of adjusting the pivotally mounted position of the recording head 31 upon the pivot pin 73, two adjusting screws 84 are respectively arranged in two threaded holes provided in the one arm of the bracket 74 and cooperate with a pin 85 carried by the plate 72 and projecting into a cooperating opening provided in the one arm of the bracket 74. For the purpose of adjusting the pivotally mounted position of the bracket 74 upon the pivot pin 75, two adjusting screws 86 are respectively arranged in two threaded holes provided in the one arm of the bracket 76 and cooperate with a pin 87 carried by the other arm of the bracket 74 and projecting into a corresponding opening provided in the one arm of the bracket 76. Finally, for the purpose of adjusting the pivotally mounted position of the bracket 76 upon the plate 77, two adjusting screws 88 are respectively arranged in two threaded holes provided in the other arm of the bracket 76 and cooperate with a pin 89 carried by the plate 77 and projecting into a cooperating opening provided in the other arm of the bracket 76. The above-described arrangement, including the various adjusting screws 84, 86 and 88, accommodates the adjustment of the composite position of the recording head 31 upon the block 80 about the three mutually perpendicular pivot pins, so that the composite position of the recording head 31 with respect to the slide 32 in any one of the three coordinate planes may be selectively adjusted.

Finally, for the purpose of positively positioning the record card 12 during the recording operation, a longitudinally extending fixture 90 is carried by the upper surface of the platen 13 adjacent to the rear edge thereof, as illustrated in Figs. 5 and 6; the fixture 90 being adapted to engage the rear edge of the record card 12 when it is in proper position upon the top surface of the platen 13. Also an upstanding register pin 91 is carried by the platform 10 adjacent to the front right-hand end of the platen 13 and adapted to engage the right-hand end of the record card 12 so as to establish the proper position thereof. Accordingly, it will be understood that when the record card 12 is placed upon the top surface of the platen 13 in engagement with the fixture 90 and with the register pin 91, it occupies a proper recording position for cooperation with the recording head 31 in its guided movement in the guide 14.

Considering now the overall operation of the recording apparatus 11 and the method involved, in order to carry out a recording operation upon the record card 12, the foot treadle 21 is first operated to move the guide 14 into its release position with respect to the platen 13; whereupon the record card 12 is placed upon the top surface of the platen 13 in proper position as determined by the fixture 90 and the register pin 91. Then the treadle 21 is operated to move the guide 14 into its clamped position with respect to the platen 13, so as securely to clamp the record card 12 between the top surface of the platen 13 and the lower surfaces of the elements 15 and 16. In placing the record card 12 upon the platen 13, it is noted that it is inserted so that the printed word thereof, corresponding to the word that is to be magnetically recorded upon the corresponding elongated magnetic medium carried thereby, occupies an inverted position adjacent to the right-hand front of the record card 12, as illustrated in Fig. 1; whereby, at this time, the corresponding elongated magnetic medium will occupy a position directly below the path of travel of the magnetic recording head 31. Also, it may be assumed that the clutch 64 occupies its disengaged position, and that the slide 32 occupies its extreme right-hand position in the guide 14. Accordingly, when the guide 14 is lowered into clamped position upon the platen 13, the recording head 31 occupies its position slightly to the right of the right-hand end of the record card 12 in its supported position. Now it may be assumed that the electrical elements of the recording apparatus 11 previously described in conjunction with Fig. 7, are in operating condition; whereby, in the present example, the word 1W ("alumnus") is being pronounced repeatedly by the loudspeaker 52. Accordingly, just following a pronouncement of the word 1W ("alumnus") by the loudspeaker 52, the clutch 64 is manually tripped into its engaged position by appropriate movement of the arm 63; whereby the traveling endless belt 57 is clutched between the clutch plates 65 and 66 so that the slide 32 carrying the recording head 31 is moved from its extreme right-hand position into its extreme left-hand position in the guide 14. During the movement of the slide 32 from its extreme right-hand position into its extreme left-hand position, as viewed in Fig. 1, the magnetic recording head 31 travels longitudinally along the corresponding elongated magnetic medium 1M corresponding to the word 1W ("alumnus"). More particularly, during this movement of the recording head 31, the pole pieces 35 of the recording head 31 travel along the elongated magnetic medium 1M in respective leading and trailing relation with respect to each other and in clamping engagement with the magnetic medium 1M in order securely to retain the magnetic medium 1M in smooth flat condition during the recording. Now follows the initiation of the movement of the recording head 31 along the magnetic medium 1M carried by the record card 12, the loudspeaker 52 again pronounces the word 1W ("alumnus") at the same time that the corresponding electric signal current is supplied to the field winding 36 of the recording head; whereby the pole pieces 35 record in magnetic form the word 1W ("alumnus") upon the elongated magnetic medium 1M carried by the record card 12.

Shortly following the complete recording of the word 1W ("alumnus") upon the associated elongated magnetic medium 1M carried by the record card 12, the slide 32 is moved into its extreme left-hand position; whereby it engages the left-hand strap 17 disposed between the elements 15 and 16, so that the clutch mechanism 64 is tripped into its disengaged position. As a practical matter, the automatic operation of the clutch mechanism 64 into its disengaged position is not critical, in view of the fact that the frictional forces exerted by the clutch plates 65 and 66 upon the front portion of the endless belt 57 permit of slippage therebetween; whereby the clutch mechanism 64 may be manually tripped into its disengaged position, when the slide 32 occupies its extreme left-hand position. In any case, the clutch mechanism 64 is operated into its disengaged position, and the slide 32 carrying the recording head 31 is brought back into its extreme right-hand position manually. Again the treadle 21 is operated so as to move the guide 14 away from the platen 13 in order to release the record card 12. At this time the record card 12 is removed from its supported position upon the top surface of the platen 13; another record card 12 is placed upon the top surface of the platen 13; and the recording operation above-described is repeated with respect to the other record card 12.

From the above description it will be appreciated that the word 1W ("alumnus") is magnetically recorded on the corresponding magnetic media 1M provided on a plurality of the record cards 12; and thereafter the endless belt 42 carried by the unit 39 is changed to provide for the recording of the second word 2W ("alumnae"); etc. Accordingly, the words 1W, 2W, 3W and 4W are successively recorded in the manner described upon the plurality of record cards 12 incident to the production of a plurality of sets of the record cards 12 for use in pronouncing dictionary apparatus of the character of that described in the previously-mentioned copending MacChesney application.

In view of the foregoing description, it is apparent that there has been provided an improved method of and apparatus for recording sound on an elongated magnetic medium carried on a record card that involves supporting the record card in a stationary position upon a platen, moving a magnetic recording head at a substantially uniform recording speed longitudinally along and in contact with the magnetic medium, and energizing the magnetic recording head with electric signal current corresponding to the sound to be recorded as it is moved along and in contact with the magnetic medium; which method and apparatus is particularly well-adapted to the mass production of record cards for pronouncing dictionary apparatus of the character of that disclosed in the previously-mentioned copending application of Chester M. MacChesney.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for recording sound on an elongated magnetic medium carried on the surface of a substantially flat record card; said apparatus comprising an elongated flat platen for supporting the record card in a substantially flat fixed position thereon with the magnetic medium exposed, an elongated guide mounted for movements toward and away from said platen into respective clamp and release positions with respect to the supported record card, means for selectively moving said guide between its clamp and release positions, a magnetic recording head carried by said guide and mounted for movement thereon over the supported record card longitudinally along and in contact with the exposed magnetic medium carried by the supported record card when said guide occupies its clamp position, mechanism operative to move said magnetic recording head on said guide at a substantially uniform recording speed, means for selectively operating said mechanism, and means for energizing said magnetic recording head with electric signal current corresponding to the sound to be recorded as it is moved on said guide.

2. Apparatus for recording sound on an elongated magnetic medium carried on the surface of a substantially flat record card; said apparatus comprising an elongated flat platen for supporting the record card in a substantially flat fixed position thereon with the magnetic medium exposed, an elongated guide mounted for movements toward and away from said platen into respective clamp and release positions with respect to the supported record card, means for selectively moving said guide between its clamp and release positions, a magnetic recording head carried by said guide and mounted for movement thereon over the supported record card longitudinally along and in contact with the exposed magnetic medium carried by the supported record card when said guide occupies its clamp position, a drive member continuously moved at a substantially uniform recording speed, mechanism operative to clutch said magnetic recording head to said drive member for movement therewith on said guide, means for selectively operating said mechanism, and means for energizing said magnetic recording head with electric signal current corresponding to the sound to be recorded as it is moved on said guide.

3. Apparatus for recording sound on an elongated magnetic medium carried on the surface of a substantially flat record card; said apparatus comprising an elongated flat platen for supporting the record card in a substantially flat fixed position thereon with the magnetic medium exposed, an elongated guide mounted for movements toward and away from said platen into respective clamp and release positions with respect to the supported record card, means for selectively moving said guide between its clamp and release positions, a magnetic recording head including a pair of adjacent longitudinally spaced-apart pole pieces and a coupled field winding, means mounting said recording head for movement on said guide over the supported record card so that said pair of pole pieces move in respective leading and trailing relation to each other and travel longitudinally along and in firm engagement with the exposed magnetic medium carried by the supported record card when said guide occupies its clamp position, mechanism operative to move said magnetic recording head on said guide at a substantially uniform recording speed, means for selectively operating said mechanism, and means for energizing said field winding with electric signal current corresponding to the sound to be recorded during the movement of said recording head.

References Cited in the file of this patent

UNITED STATES PATENTS

| | | |
|---|---|---|
| 873,084 | Poulsen | Dec. 10, 1917 |
| 2,086,798 | Grunberg | July 13, 1937 |
| 2,092,765 | Losier | Sept. 14, 1937 |
| 2,124,673 | Puma | July 26, 1938 |
| 2,427,383 | Bryce | Sept. 16, 1947 |
| 2,548,011 | Frost | Apr. 10, 1951 |
| 2,603,006 | McChesney | July 15, 1952 |
| 2,647,168 | Rivas | July 28, 1953 |
| 2,714,010 | Gruber | July 26, 1955 |